(12) United States Patent
Ditto et al.

(10) Patent No.: US 9,703,647 B2
(45) Date of Patent: Jul. 11, 2017

(54) AUTOMATED POLICY MANAGEMENT IN A VIRTUAL MACHINE ENVIRONMENT

(75) Inventors: Mark Ambrose Ditto, Eastbound, WA (US); James Robert Olson, Afton, MN (US)

(73) Assignee: Veritas Technologies LLC, Mountain View, CA (US)

( * ) Notice: Subject to any disclaimer, the term of this patent is extended or adjusted under 35 U.S.C. 154(b) by 29 days.

(21) Appl. No.: 13/341,381

(22) Filed: Dec. 30, 2011

(65) Prior Publication Data

US 2013/0173771 A1 Jul. 4, 2013

(51) Int. Cl.
| | |
|---|---|
| *G06F 15/173* | (2006.01) |
| *G06F 11/14* | (2006.01) |
| *G06F 11/20* | (2006.01) |
| *G06F 11/34* | (2006.01) |

(52) U.S. Cl.
CPC ...... *G06F 11/1484* (2013.01); *G06F 11/1438* (2013.01); *G06F 11/2035* (2013.01); *G06F 11/3442* (2013.01)

(58) Field of Classification Search
CPC .. G06F 11/1461; G06F 11/1484; G06F 3/067; G06F 11/1458; G06F 11/1469; G06F 11/3409; G06F 9/5077; G06F 11/1456; G06F 11/1464
USPC .................... 709/223; 714/4.11, 13; 711/162
See application file for complete search history.

(56) References Cited

U.S. PATENT DOCUMENTS

| | | | | |
|---|---|---|---|---|
| 8,185,776 B1* | 5/2012 | Gentes | ............... | G06F 11/1438 709/223 |
| 2004/0044707 A1* | 3/2004 | Richard | .............. | G06F 11/1461 |
| 2005/0262076 A1* | 11/2005 | Voskuil | ..................... | G06F 8/65 |
| 2006/0184936 A1* | 8/2006 | Abels | .................... | G06F 9/5077 718/1 |
| 2007/0271428 A1* | 11/2007 | Atluri | ................ | G06F 11/1451 711/162 |
| 2009/0222812 A1* | 9/2009 | Nissen | ............... | G06F 11/2002 717/173 |
| 2009/0313447 A1* | 12/2009 | Nguyen | .............. | G06F 11/1451 711/162 |
| 2010/0070725 A1* | 3/2010 | Prahlad | ............... | G06F 11/1453 711/162 |
| 2010/0161646 A1* | 6/2010 | Ceballos | ........... | G06F 17/30398 707/769 |
| 2011/0145818 A1* | 6/2011 | Vemuri | ................. | G06F 3/0604 718/1 |
| 2011/0209145 A1* | 8/2011 | Chen | ................... | G06F 9/45558 718/1 |

(Continued)

FOREIGN PATENT DOCUMENTS

GB          EP0621527 A1 * 3/1994 ............ G06F 3/023

*Primary Examiner* — Farid Homayounmehr
*Assistant Examiner* — Lizbeth Torres-Diaz
(74) *Attorney, Agent, or Firm* — Wilmer Cutler Pickering Hale and Dorr LLP

(57) ABSTRACT

A method for providing object policy management. The method includes accessing a distributed computer system having a plurality of nodes, and initiating a new object policy object backup protection for a new object. The method further includes processing a list of object attributes available for the new object policy, and processing the list to generate an object management policy. The new object is then processed in accordance with the object management policy.

18 Claims, 21 Drawing Sheets

Setting up Resource Limit based on vSphere objects

(56) References Cited

U.S. PATENT DOCUMENTS

| | | | | |
|---|---|---|---|---|
| 2011/0283279 A1* | 11/2011 | Graves | ................ | G06F 9/44589 |
| | | | | 718/1 |
| 2011/0289204 A1* | 11/2011 | Hansson | ............... | G06F 9/5077 |
| | | | | 709/224 |
| 2013/0014107 A1* | 1/2013 | Kirchhofer | ........... | G06F 9/5083 |
| | | | | 718/1 |
| 2014/0007097 A1* | 1/2014 | Chin | ................... | G06F 9/45533 |
| | | | | 718/1 |

* cited by examiner

Setting up Resource Limit based on vSphere objects

Automatic VM Selection With NetBackup

Select host for performing VM select

Query generator (Basic mode)

Query Generator: Value

Value Selected from Menu

Query Ready to be Added

Additional Rule - Ready to be Added

Query Generator: Sample

Advanced Mode: Free form Query

Example: Test Query Results

FIG. 19

AUTOMATED POLICY MANAGEMENT IN A VIRTUAL MACHINE ENVIRONMENT

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail.

The use of virtual machines and virtual machine technology has proliferated in such high availability environments. Management concerns also proliferated with the management and the backup of tens or even thousands of virtual machines. To date the selection of objects for backup has been limited to wild-carded object names and time of last modification. The query language allows selection of object based on any number of attributes provided by that object and the logical combination of those attributes.

However, there exists a problem in that there is no management functionality that can scale with the addition of hundreds of virtual machines or other objects that need to be backed up.

SUMMARY OF THE INVENTION

Embodiments of the present invention provide application functionality protection. Embodiments of the present invention efficiently implement a cluster wide application failover that greatly enhances application availability.

In one embodiment, the present invention is implemented as a computer implemented method for providing object policy management. The method includes accessing a distributed computer system having a plurality of nodes, and initiating a new object policy object backup protection for a new object. The method further includes processing a list of object attributes available for the new object policy, and processing the list to generate an object management policy. The new object is then processed in accordance with the object management policy.

In one embodiment, the new object comprises a virtual machine.

In one embodiment, the new object comprises a plurality of virtual machines.

In one embodiment, the list of object attributes comprises attributes for a virtual machine.

In one embodiment, the object management policy comprises a backup protection policy for the new object.

In one embodiment, the list of object attributes functions with logical operators to define a group that will operate with the object management policy.

In one embodiment, the list of object attributes enables a selection of objects that belong to a group subject to the object management policy.

In one embodiment, the present invention is implemented as a computer readable storage medium having stored thereon, computer executable instructions that, if executed by a computer system cause the computer system to perform a method for providing object policy management. The method includes accessing a distributed computer system having a plurality of nodes, and initiating a new object policy object backup protection for a new object. The method further includes processing a list of object attributes available for the new object policy, and processing the list to generate an object management policy. The new object is then processed in accordance with the object management policy.

In one embodiment, the present invention is implemented as a server computer system having a processor coupled to a computer readable storage media and executing computer readable code which causes the computer system to implement a object policy manager that performs an object policy management method. The method includes accessing a distributed computer system having a plurality of nodes, and initiating a new object policy object backup protection for a new object. The method further includes processing a list of object attributes available for the new object policy, and processing the list to generate an object management policy. The new object is then processed in accordance with the object management policy.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 19 shows a GUI screen that shows the results of an exemplary test in accordance with one embodiment of the present invention.

DETAILED DESCRIPTION OF THE INVENTION

Figure 1:
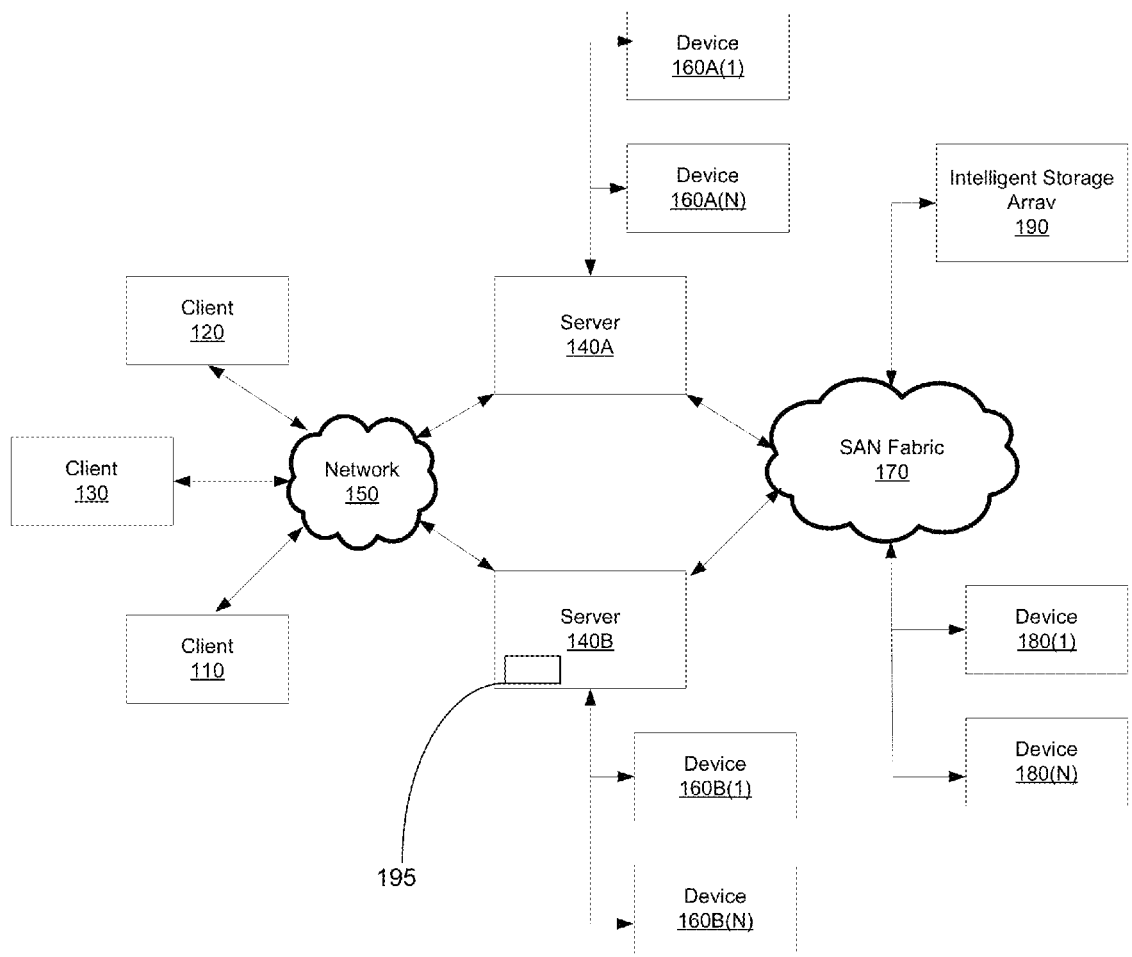
FIG. 1 shows a block diagram depicting a network architecture in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 is a block diagram depicting a network architecture 100 in which client systems 110, 120 and 130, as well as storage servers 140A and 140B are coupled to a network 150 in accordance with one embodiment of the present invention. The storage servers 140A and 140B can be used to instantiate one or more virtual machines. A storage server 140A is further depicted as having storage devices 160A (1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a policy and resource throttling manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
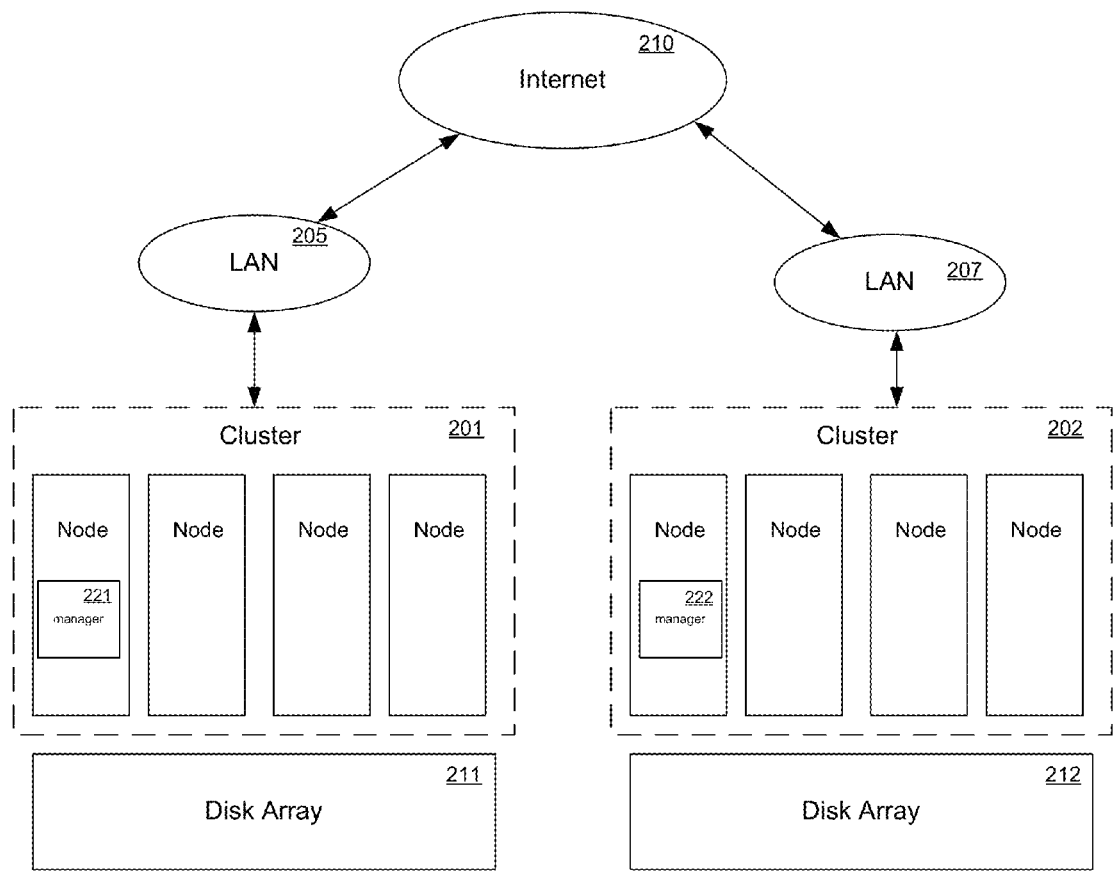
FIG. 2 shows a diagram depicting a high availability multi-cluster-based computing system in accordance with one embodiment of the present invention.

FIG. 2 shows a diagram depicting a high availability multi-cluster-based computing system in accordance with one embodiment of the present invention. As illustrated in FIG. 2, two clusters 201-202 are shown. The clusters 201-202 each comprise a four node cluster. Each of the constituent nodes is shown connected to a respective disk array 211-212. The nodes of each cluster communicate with one another via local area networks 205-207. These local area networks are in turn connected to the Internet 210. Although the embodiments described in the context of clusters of four nodes, it should be appreciated that embodiments of the present invention can readily scale and function in distributed computer systems and/or cloud based computer systems having hundreds or thousands of nodes.

FIG. 2 additionally shows the basic layout of a typical high-availability multi-cluster computer system environment. As described above, a high availability cluster is a computer cluster that functions primarily by providing high availability of services to users and/or applications. The multiple redundant nodes of each cluster are used to provide service in case one or more nodes of a cluster should fail. For example, if a node with a particular application crashes, the application will be unavailable until the node is recovered. HA clustering implements a fail over of the particular application to one of the redundant nodes of the cluster.

FIG. 2 also shows the inclusion of managers (e.g., policy and resource throttling managers) in each of the clusters 201-202. The managers implement the virtual machine protection and backup policy management and the physical resource throttling functionality of embodiments of the present invention. In the FIG. 2 embodiment, the storage and the input and output to that storage is provided by the respective disk arrays 211-212. The managers can also monitor real time virtual machine and node machine health and a backup infrastructure that is protecting node machine state and the virtual machine data.

Figure 3:
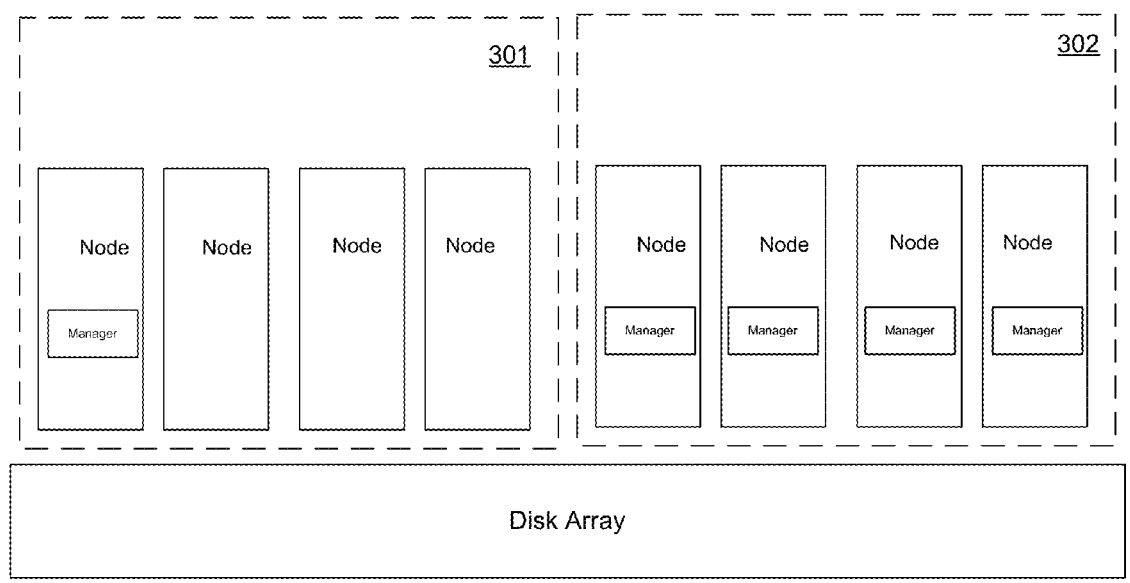
FIG. 3 shows a diagram depicting a high availability computing system in accordance with one embodiment of the present invention.

FIG. 3 shows a diagram depicting a high availability computing system in accordance with one embodiment of the present invention. The FIG. 3 embodiment is yet another alternative to the FIG. 2 embodiment in that a number of nodes are coupled to a single disk array, and these nodes communicate with each other without the use of any clustering software. The FIG. 3 embodiment thus shows the functionality of embodiments of the present invention are not tied to clustering functionality.

FIG. 3 shows the manner in which the nodes can be designated as groups (e.g., group 301 and group 302). In this case each group comprises four nodes. Each of the constituent nodes is shown connected to a common disk array. In group 301, a single manager provides policy and throttling functionality for each of the other nodes in the group. In group 302, each of the nodes in the group has its own manager. As stated above, although the embodiments described in the context of clusters of four nodes, it should be appreciated that embodiments of the present invention can readily scale and function in distributed computer systems and/or cloud based computer systems having hundreds or thousands of nodes.

As described above, a high availability cluster is a computer cluster that functions primarily by providing high availability of services to users and/or applications. The multiple redundant nodes of each cluster are used to provide service in case one or more nodes of a cluster should fail. For example, if a node with a particular application crashes, the application will be unavailable until the node is recovered. HA clustering implements a fail over of the particular application to one of the redundant nodes of the cluster.

Figure 4:
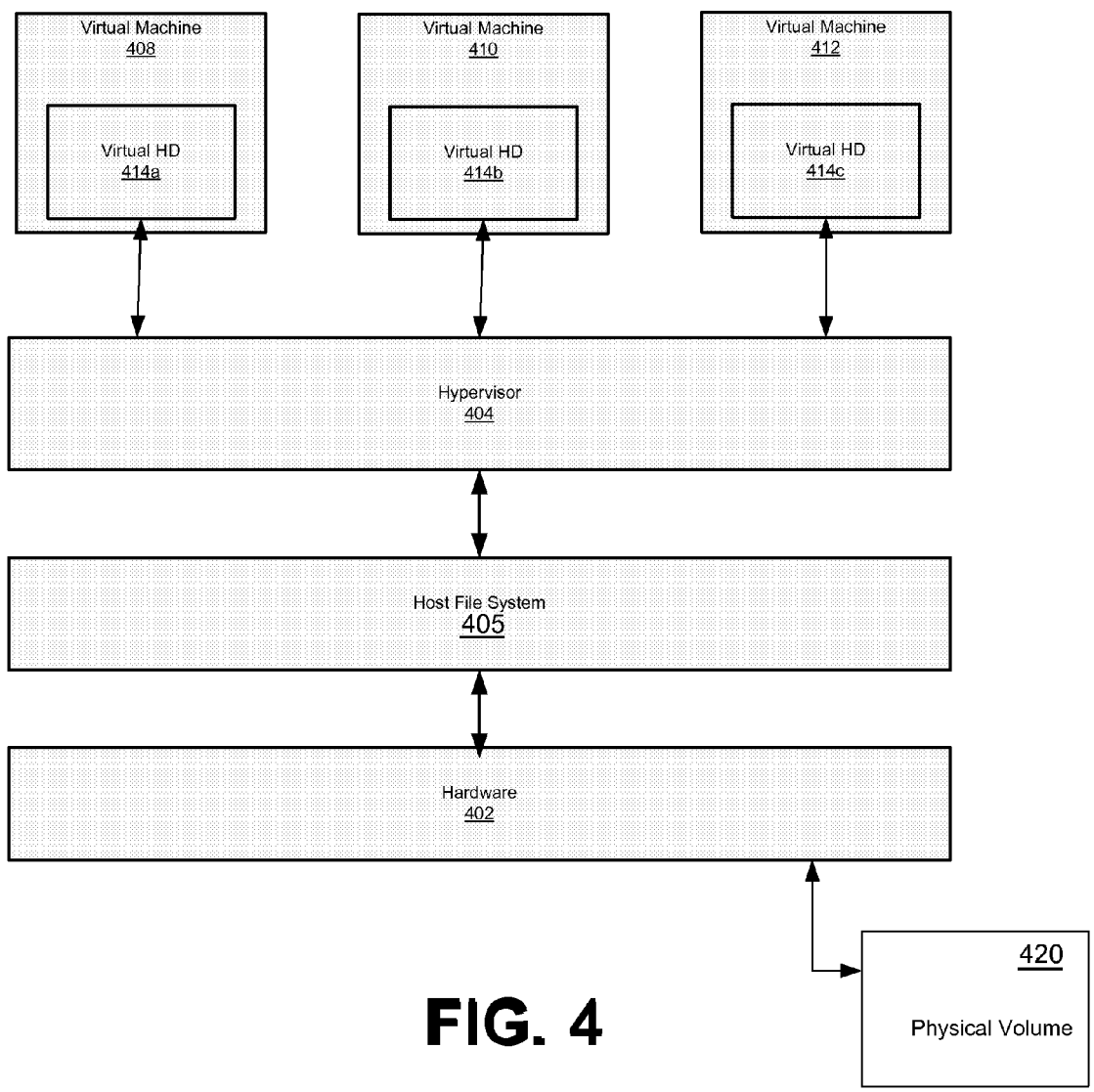
FIG. 4 shows a block diagram of an exemplary virtual environment, in accordance with one embodiment of the present invention.

FIG. 4 shows a block diagram of an exemplary virtual environment, in accordance with one embodiment of the present invention. Exemplary virtual environment 400 includes a host file system 405, hypervisor 404, and virtual machines 408-412. Components of exemplary virtual environment 400 typically execute on or otherwise be part of a distributed computing system (e.g., servers 140a and 140b of FIG. 1).

Hypervisor 404 interfaces with hardware 402 (e.g., of servers 140a-b) and provides resources and services to virtual machines 408-412. In one embodiment, hypervisor 404 is part of a trusted computing base (TCB). Hypervisor 404 provides abstractions including emulated devices of resources in hardware 402 to virtual machines 408-412. In this manner, the virtual hard drives 414a-c are emulated via the hypervisor 404 and the host file system 405 by using a physical volume 420. The physical volume 420 can be, for example, one or more LUNs on server 140A or 140B, or one of storage devices 160A(1)-(N), 160B(1)-(N), 180(1)-(N) or storage array 190. During the conversion process, data from the physical volumes is transferred to physical volume 420 which in turn instantiates the virtual file systems (e.g., virtual hard drives 414a-c).

As described above, as part of its virtual machine protection functionality, the manager can restore the virtual machine to its last known good point in time image by using a standby virtual machine provisioned from the last known good point in time image to restore virtual machine functionality. As shown in FIG. 4, each of the virtual machines 408-412 can be standby virtual machines managed by the manager. For example, each of the virtual machines can be provisioned with a high-availability agent. Upon notification, a backup server (e.g., that also provides backups of virtual machines) can restore a selected virtual machine to the last good point in time image.

Embodiments of the present invention advantageously provides an intuitive GUI functionality to help manage the selection of objects for backup. This facility is provided without any limitations with regard to "wild-carded" object names and time of last modification metadata. Embodiments of the present invention enable a query language that allows selection of objects based on a large number of attributes provided by that object, and the logical combination of those attributes.

For example, embodiment of the present invention can manage the selection and grouping of virtual machines based upon attributes of the virtual machines. One such attribute could be, whether the virtual machine is powered on or powered off. Additionally, the manager (e.g., policy and resource throttling manager) can utilize combinations of attributes such as "powered off" and "name" does not contain the string "test" for added flexibility. In this manner, the manager can combine a large number of possible logical combinations of attributes along with the extensive number of individual attribute types in order to implement a general purpose solution available for object processing.

In one embodiment, the present invention can be implemented as a manager that provides a means of selecting objects for backup (e.g., selecting virtual machines for backup) and restore operations based on a variable set of attributes that can be compared with operators such as "equal", "greater than", "contains", "one of" etc., and logically connected with operators such as "and" and "or". One use case scenario can involve, for example, selecting virtual machines where "VMName contains "test" and VMPower equal "off" or VMSize "less 1000".

In this manner, the manager can be used to select virtual machine backup objects based on multiple combined attributes with logical operators. This functionality to allow a near infinite number of possibilities for customers using the manager to select objects in their individual computing environment for backup. Such selection allows for reduced backup times by eliminating unwanted objects, and for a categorization of objects for different processing such as, for example, different SLAs (Service Level Agreements).

Figure 5:
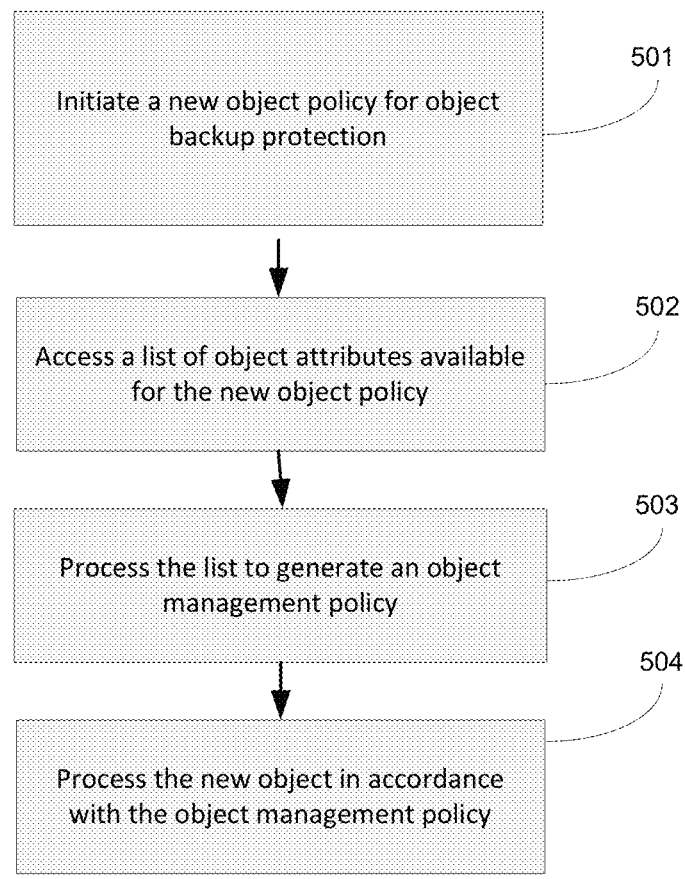
FIG. 5 shows a diagram illustrating a policy management process in accordance with one embodiment of the present invention.

FIG. 5 shows a diagram illustrating a policy management process 500 in accordance with one embodiment of the present invention. As depicted in FIG. 5, process 500 shows exemplary operating steps of a process of selecting objects back up in accordance with a flexible object policy manager.

Process 500 begins in step 501, where a manager (e.g., policy and resource throttling manager 195) initiates a new object policy for object backup protection.

In step 502, a list of object attributes available for the new object policy is then accessed. As described above, the various combinations of attributes in the different operators to be used to process them will provide a large amount of flexibility.

In step 503, the attribute list is processed in order to generate the object management policy. As described above, this object management policy can be fashioned to work with the various commissions of attributes and the different operators in order to implement a specific management policy for a specific computing environment.

In step 504, consequently, the new object is processed in accordance with the newly created object management policy. In this manner, for example, a new backup strategy can be used for a number of virtual machines, thereby providing protection specifically tailored for that number of virtual machines.

It should be noted that embodiments of the present invention also provides a throttling functionality. This throttling functionality is now described.

Backups of virtual machines can stress components of the virtual environment. For example, when multiple backups are performed in parallel without regard for this impact, one or more such backups can fail or the virtual environment itself can have failures. An example is the recommendation by some virtual machine functionality providers that no more than four concurrent backups be performed on the same physical data storage device. Embodiments of the present invention can advantageously throttle usage in order to ensure such limits are not exceeded.

Embodiment of the present invention can implement such throttling without requiring a manual organizing of virtual machines into backup jobs based on what components of the virtual environment they reside on. No manual intervention would be required in order to restrict the number of virtual machines concurrently backed up by a given job. No daily manual maintenance would be required. For example, the ease with which virtual machines can be moved in a computing environment can be routinely discovered, tracked and processed by embodiments of the present invention.

Embodiments of the present invention implement a throttling functionality that controls certain resource limits in order to specify maximum stress limits that can be imposed upon the infrastructure. This allows what is the present invention to avoid inefficiencies whereby, in conventional implementations, a backup manager typically requires daily manual manipulation of its managed backup jobs in order to maintain limits on the stressing of computing environment infrastructure components to avoid backup failures and virtual environment failures due to overuse.

In one use case scenario, a throttling manager, during a process of virtual machine discovery, also discovers the components of the virtual environment that the virtual machine resides on. This information is then passed to the job scheduler functionality of the manager. In one embodiment, the job scheduler can detect and maintain counts on the named resources for the components, and can consult, for example, a user controlled set of limits for these named resources in determining which backup to start when scheduling backups. This allows the manager to automatically adjust to changes in the computing environment and maintain user defined limits without user intervention.

In this manner, by implementing a functionality that automatically eliminates backup and virtual environment failures, a very useful feature is provided. Virtual environments can be highly volatile and the time required to manually maintain the backup environment is typically a major complaint for backup administrators.

Figure 6:
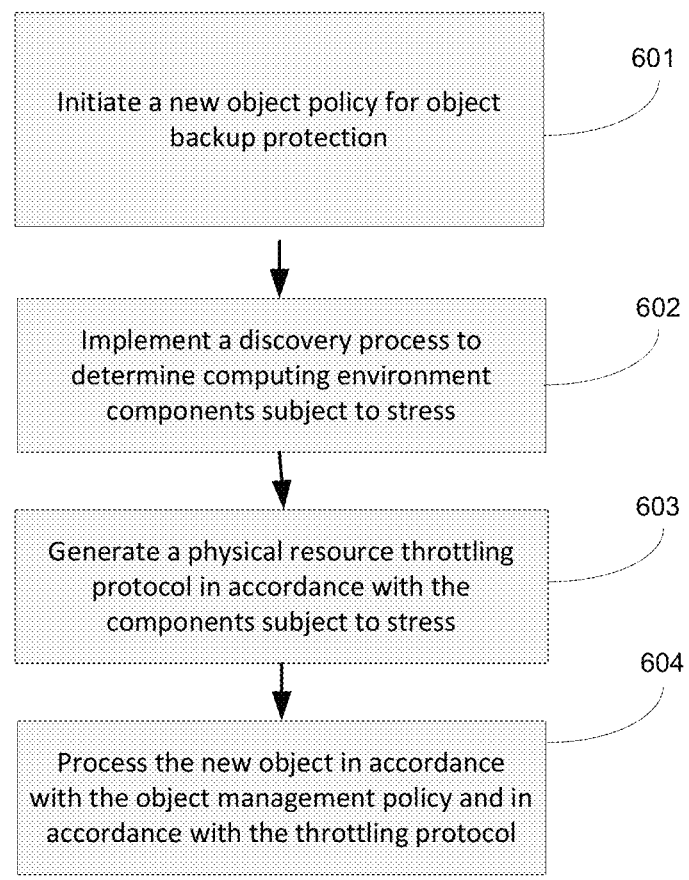
FIG. 6 shows a diagram illustrating a throttling management process in accordance with one embodiment of the present invention.

FIG. 6 shows a diagram illustrating a throttling management process 600 in accordance with one embodiment of the present invention. As depicted in FIG. 6, process 600 shows exemplary operating steps of a process of computer environment discovery and object backup in accordance with a flexible throttling protocol.

Process 600 begins in step 601, where a manager (e.g., policy and resource throttling manager 195) initiates a new object policy for object backup protection.

In step 602, in step 602, a discovery process is performed to determine computing firm components that may be subject to stress. As described above, a throttling manager, during a process of virtual machine discovery, also discovers the components of the virtual environment that the virtual machine resides on. This information is then passed to the job scheduler functionality of the manager.

In step 603, a physical resource throttling protocol is generated in accordance with the discovered components that are subject to stress.

In step 604, consequently, the new object is processed in accordance with the newly created a throttling protocol. In this manner, for example, a new backup strategy can be used for a number of virtual machines, thereby providing protection specifically tailored for that number of virtual machines while ensuring the processing does not fail due to over-stressed computing environment components.

Figure 7:
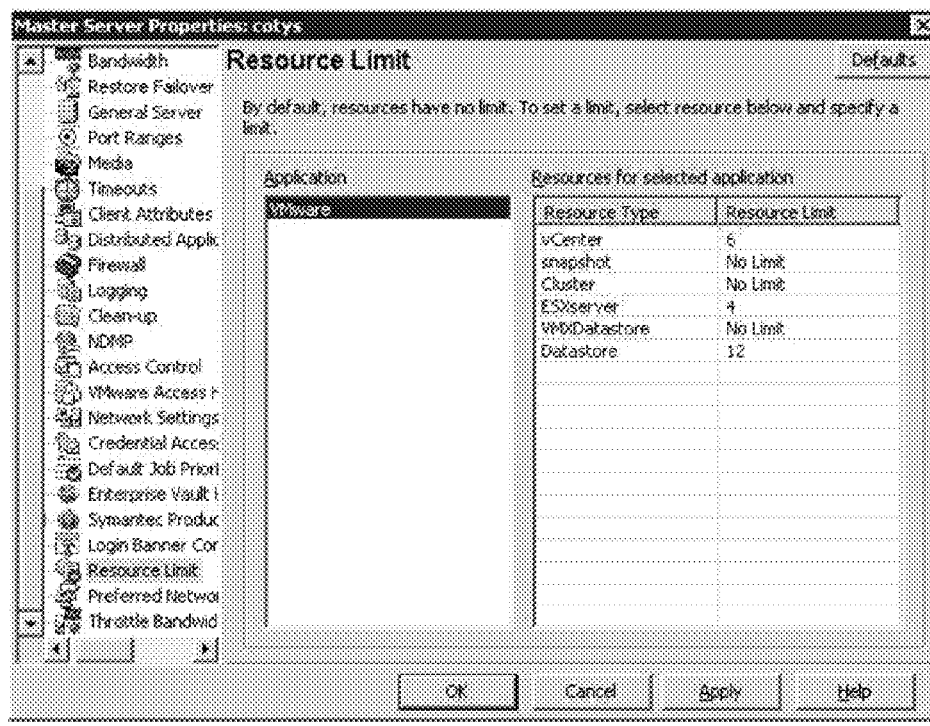
FIG. 7 shows a GUI screen that would enable user set resource limits or the simple selection of default resource limits in accordance with one embodiment of the present invention.
Figure 8:
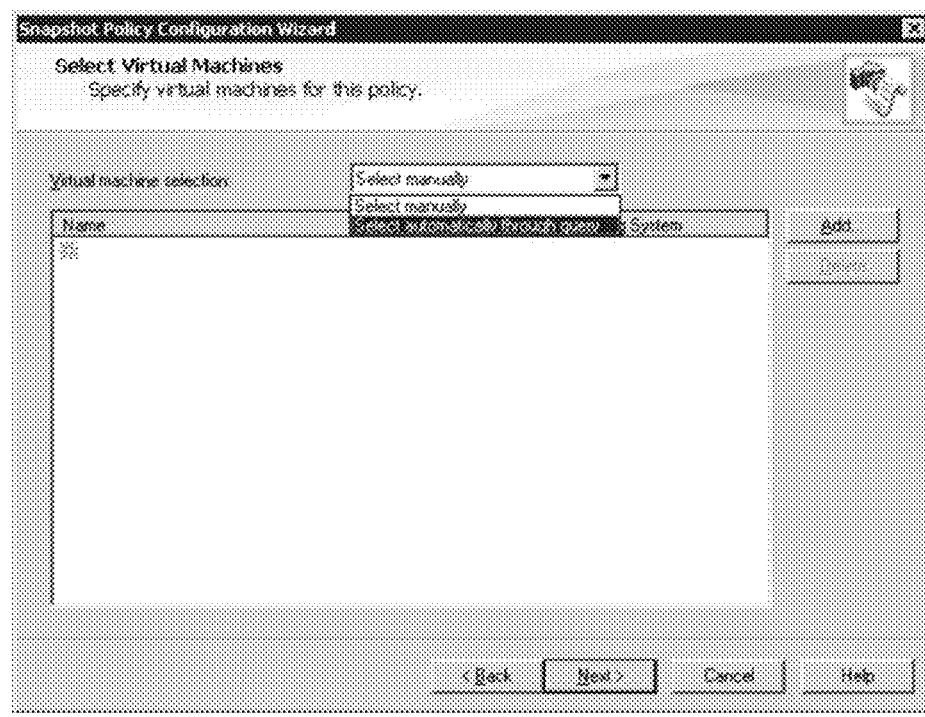
FIG. 8 shows how automatic virtual machine selection can be used in accordance with one embodiment of the present invention.
Figure 9:
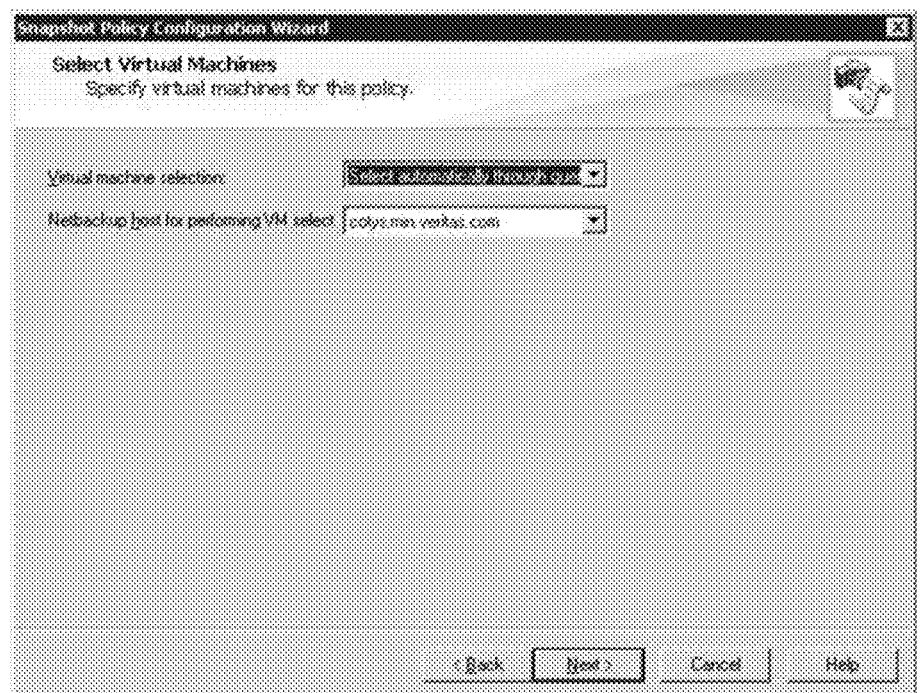
FIG. 9 shows how additional virtual machines can be selected for the specified policy according to one embodiment of the present invention.
Figure 10:
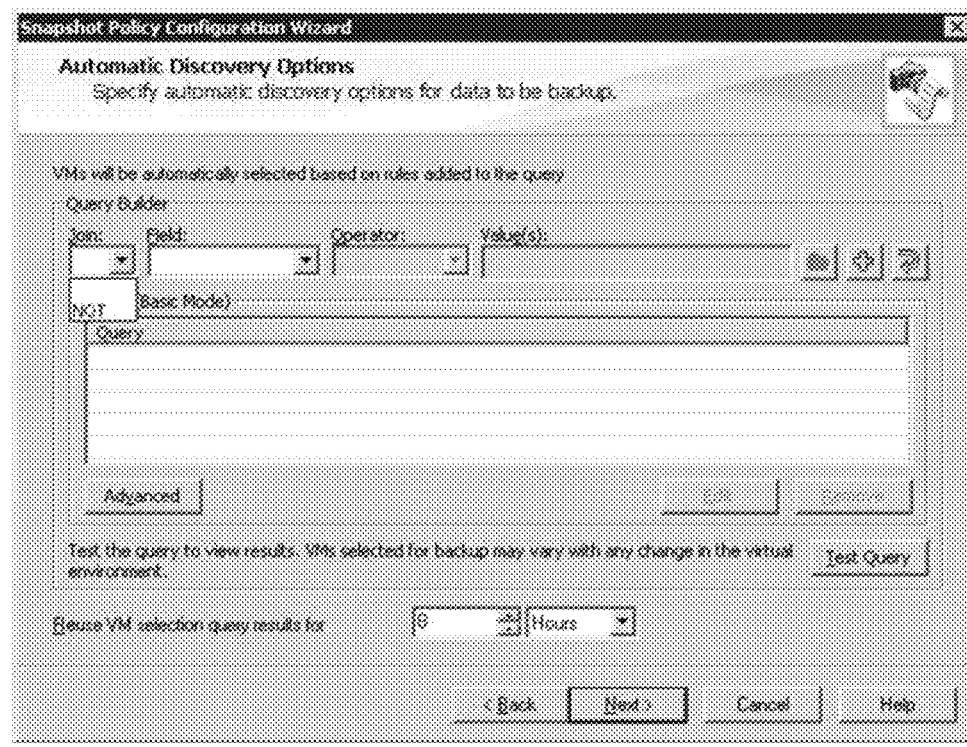
FIG. 10 shows the GUI screen whereby logical operators can be combined with attributes in order to set the proper policy in accordance with one embodiment of the present invention.

FIG. 7 through FIG. 19 comprise a sequence of figures that illustrates the operation of a graphical user interface of a policy and resource throttling manager in accordance with one embodiment of the present invention. FIG. 7 shows a GUI screen that would enable user set resource limits or the simple selection of default resource limits. FIG. 8 shows how automatic virtual machine selection can be used. Alternatively, FIG. 8 also shows how manual selection can be enabled. FIG. 9 shows how additional virtual machines can be selected for the specified policy. FIG. 10 shows the GUI screen whereby logical operators can be combined with attributes in order to set the proper policy. FIG. 10 also shows how the manager can test a defined query to determine the behavior.

Figure 11:
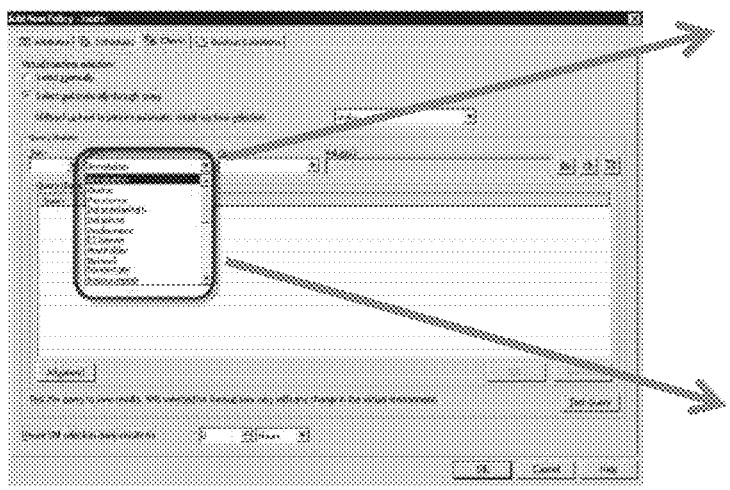
FIG. 11 shows a GUI screen where a number of attributes are available for selection along with their available fields in accordance with one embodiment of the present invention.
Figure 12:
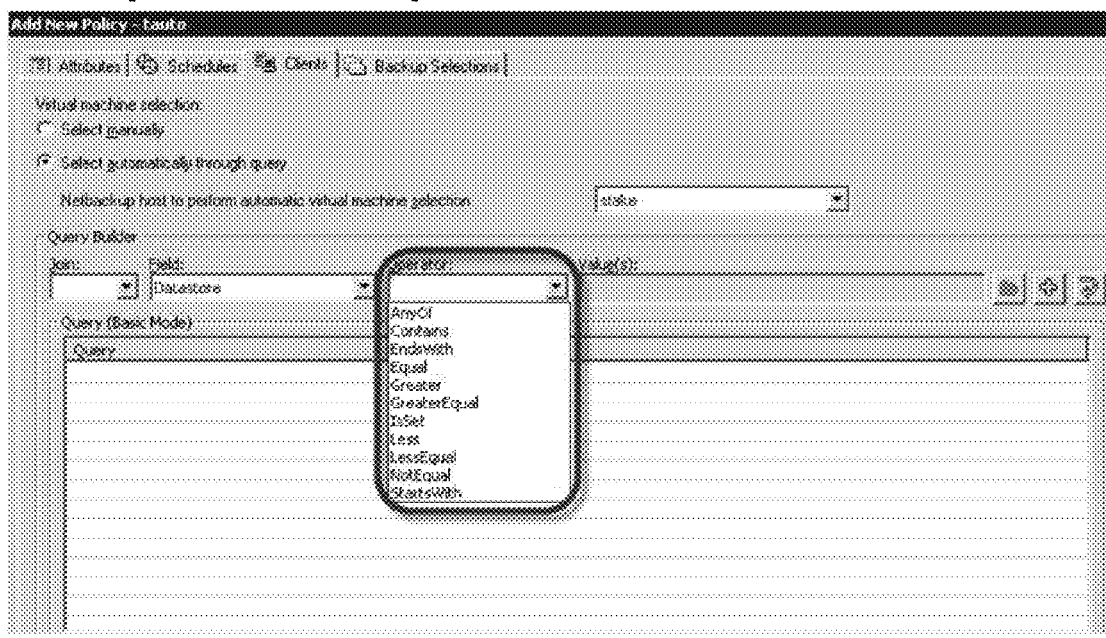
FIG. 12 shows the logical operators available for which to fashion a policy in accordance with one embodiment of the present invention.
Figure 13:
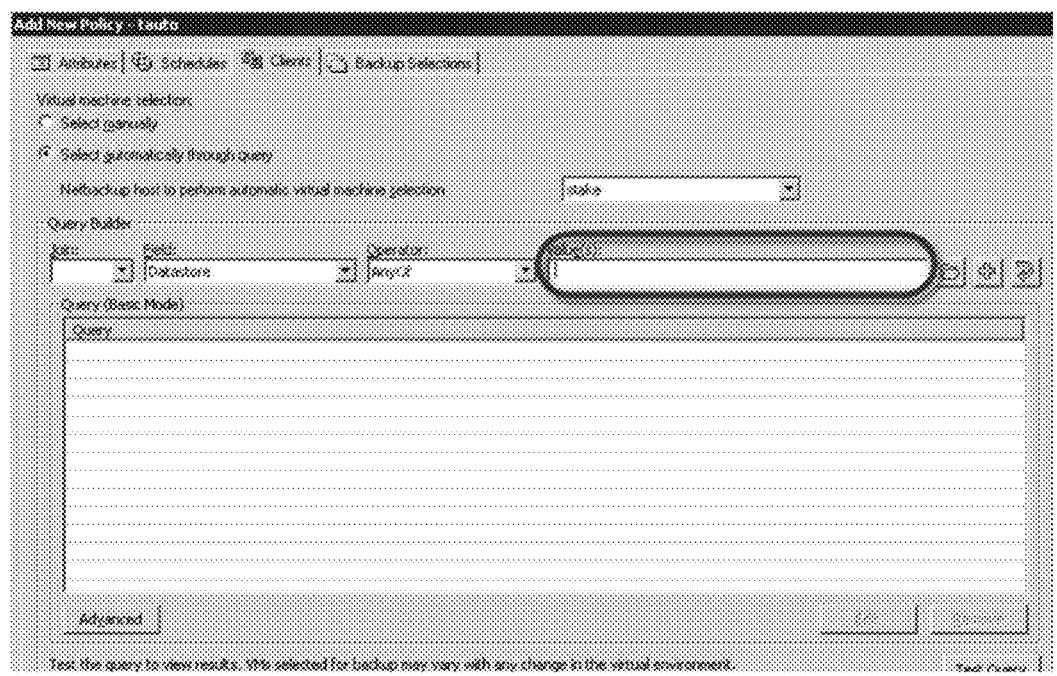
FIG. 13 shows the values operator that enables the selection of multiple objects in the data store in accordance with one embodiment of the present invention.
Figure 14:
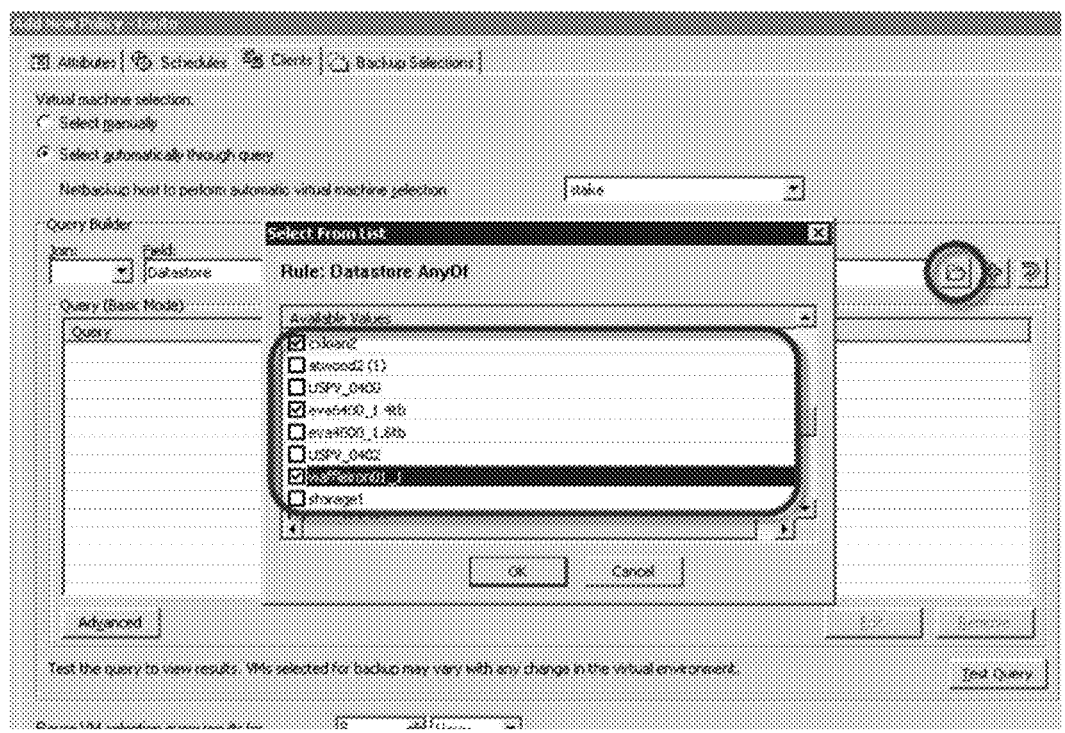
FIG. 14 shows the GUI screen where selected data stores can be specified from a drop-down list in accordance with one embodiment of the present invention.
Figure 15:
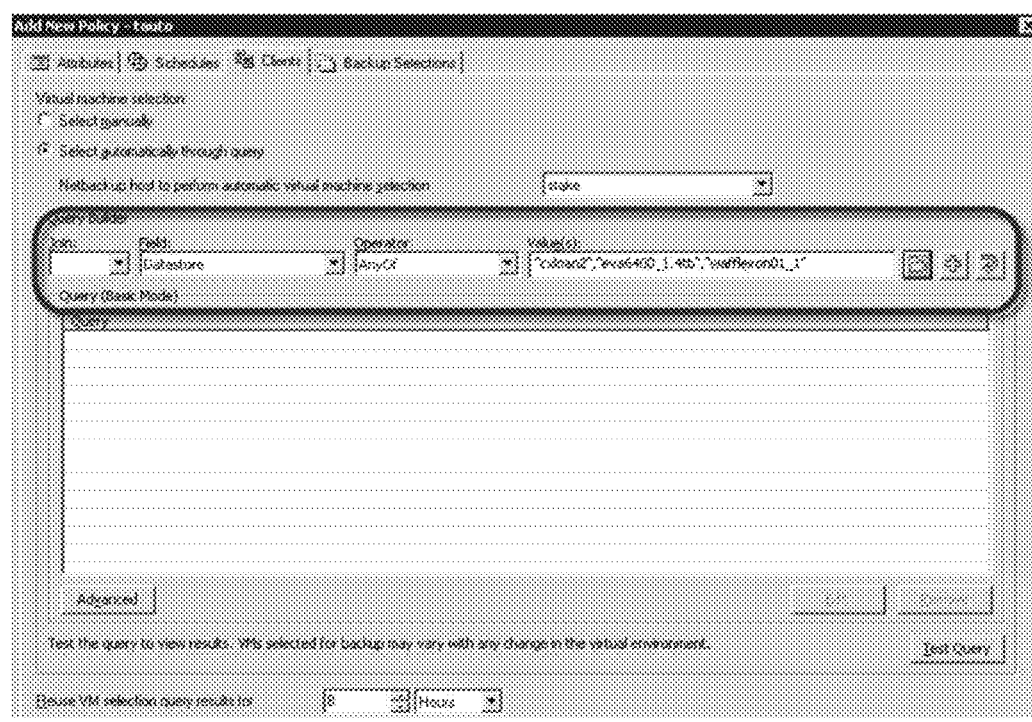
FIG. 15 shows the completed query that is ready to be added, for example, to the processing queue in accordance with one embodiment of the present invention.
Figure 16:
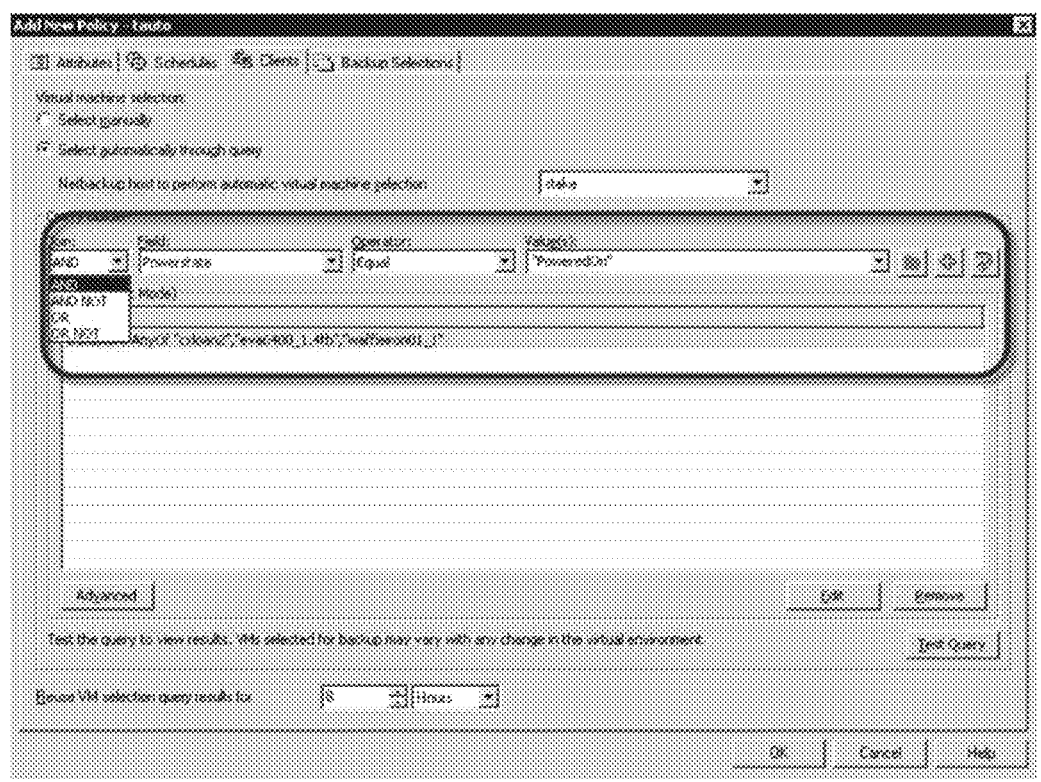
FIG. 16 shows an additional rule ready to be added to the processing queue in accordance with one embodiment of the present invention.
Figure 17:
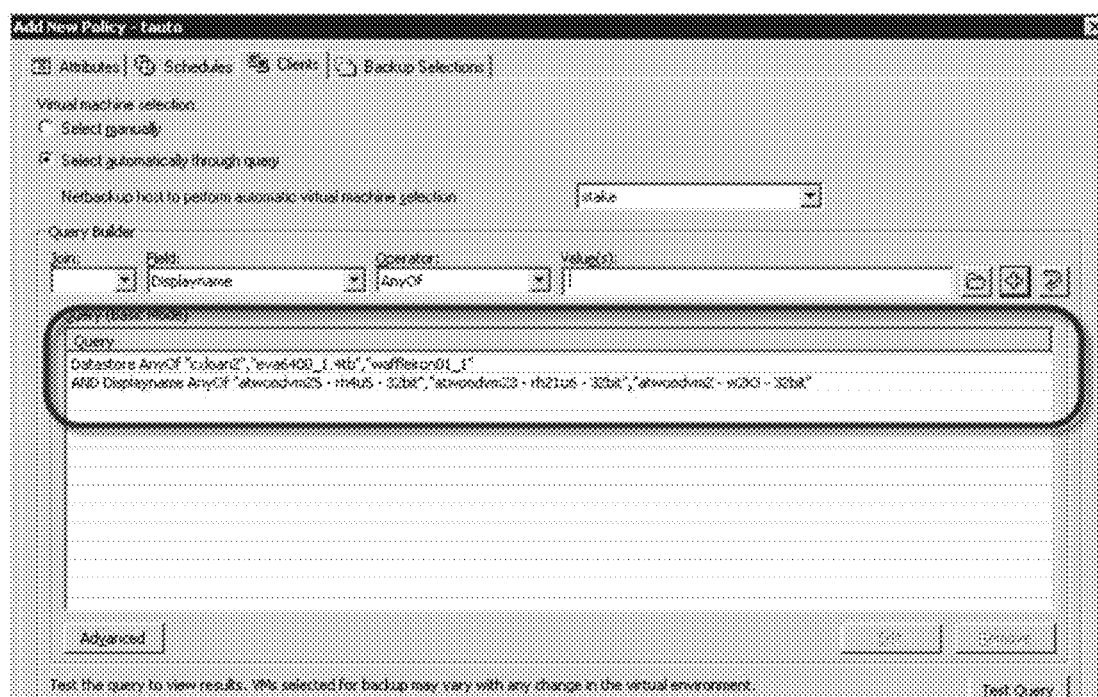
FIG. 17 shows a complete query with an additional rule appended to it in accordance with one embodiment of the present invention.
Figure 18:
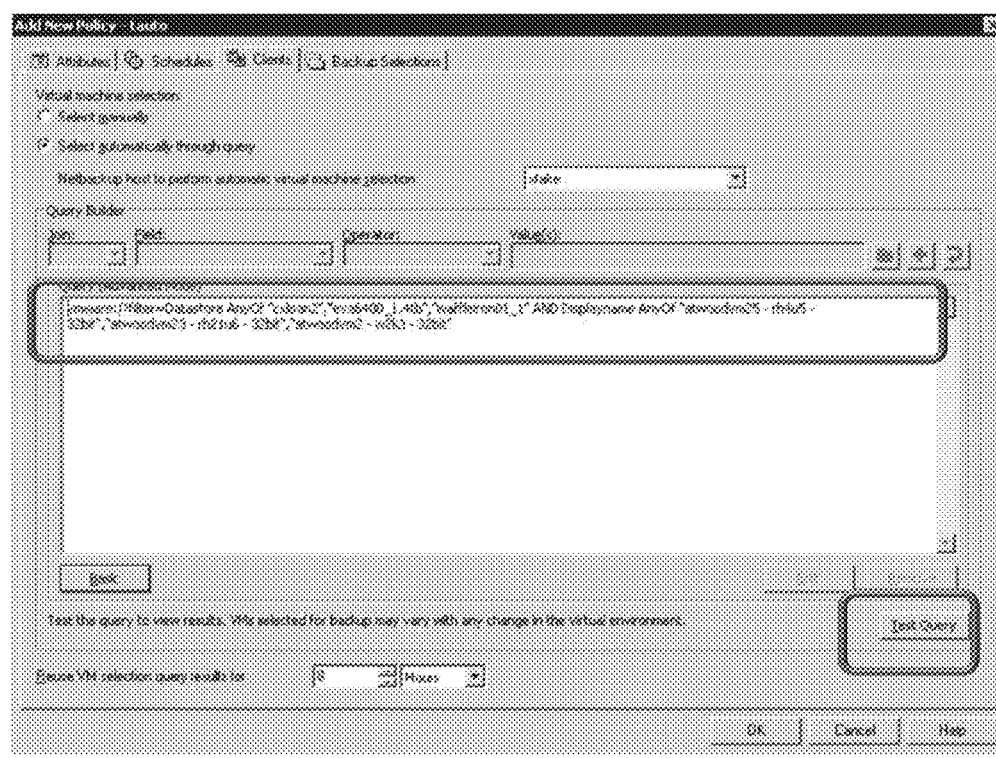
FIG. 18 shows a GUI screen where a user can enter in by hand (e.g., via keyboard) the completed free-form query, and then test the query in order to ensure satisfactory behavior in accordance with one embodiment of the present invention.
Figure 19:
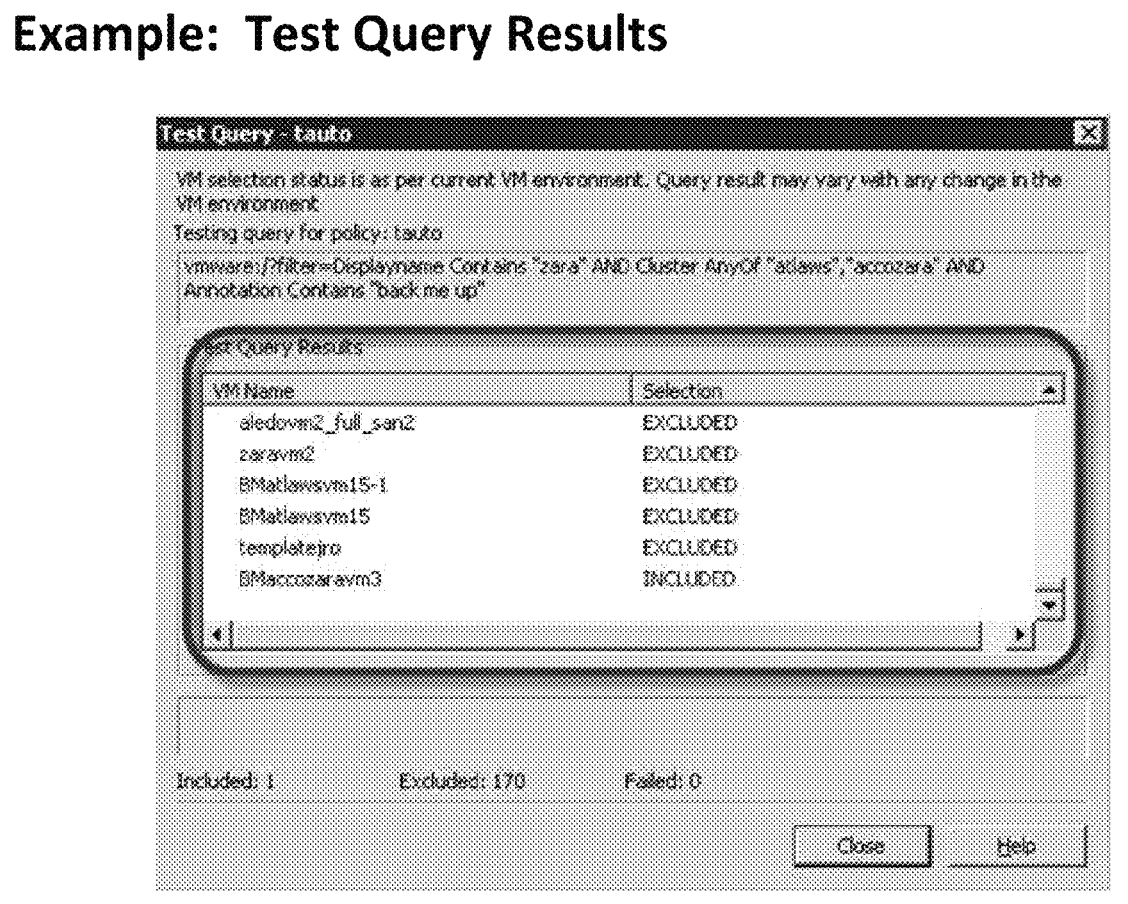

FIG. 11 shows a GUI screen where a number of attributes are available for selection along with their available fields. FIG. 12 shows the logical operators available for which to fashion a policy. FIG. 13 shows the values operator that enables the selection of multiple objects in the data store. FIG. 14 shows the GUI screen where selected data stores can be specified from a drop-down list. FIG. 15 shows the completed query that is ready to be added, for example, to the processing queue. FIG. 16 shows an additional rule ready to be added to the processing queue. FIG. 17 shows a complete query with an additional rule appended to it. FIG. 18 shows a GUI screen where a user can enter in by hand (e.g., via keyboard) the completed free-form query, and then test the query in order to ensure satisfactory behavior. FIG. 19 shows a GUI screen that shows the results of an exemplary test.

Figure 20:
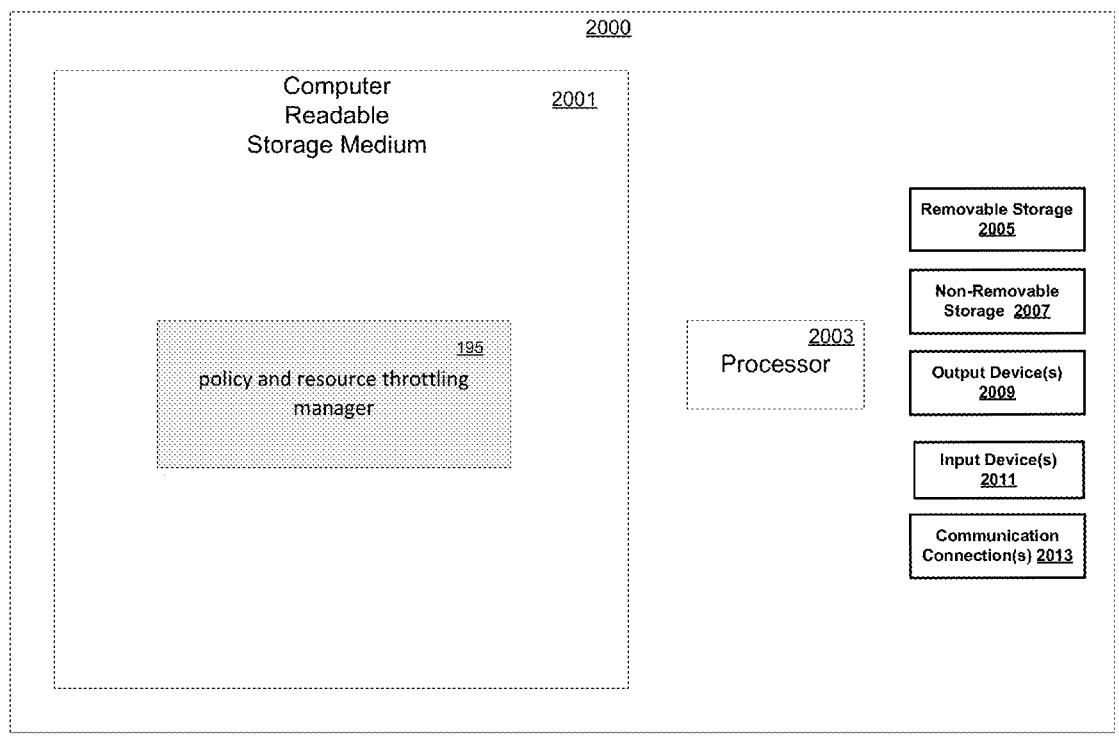
FIG. 20 shows an exemplary computer system in accordance with one embodiment of the present invention.

FIG. 20 shows an exemplary computer system 2000 according to one embodiment. Computer system 2000 depicts the components of a basic computer system providing the execution environment for certain hardware-based and software-based functionality for the above described embodiments. For example, computer system 2000 can be a system upon which the one or more software agents (e.g., manager 195 from FIG. 1) are instantiated. Computer system 2000 can be implemented as, for example, a server computer system, workstation computer system, desktop computer system, or laptop computer system. Similarly, computer system 2000 can be implemented as a handheld device. Computer system 2000 typically includes at least some form of computer readable media (e.g., computer readable storage medium 2001). Computer readable media can be a number of different types of available media that can be accessed by computer system 2000 and can include, but is not limited to, computer storage media.

In its most basic configuration, computer system 2000 typically includes processing unit 2003 and memory 2001. Depending on the exact configuration and type of computer system 2000 that is used, memory 2001 can be volatile (e.g., such as DRAM, etc.) 2001$a$, non-volatile 2001$b$ (e.g., such as ROM, flash memory, etc.) or some combination of the two. Similarly, the memory 2001 can comprise other devices besides solid-state devices, such as, for example, magnetic disk-based media, optical media, or the like.

Additionally, computer system 2000 can include other mass storage systems (e.g., removable 2005 and/or non-removable 2007) such as magnetic or optical disks or tape. Similarly, computer system 2000 can include input devices 2009 and/or output devices 2011 (e.g., such as a display). Computer system 2000 can further include network connections 2013 to other devices, computers, networks, servers, etc. using either wired or wireless media. As all of these devices are well known in the art, they need not be discussed in detail.

It should further be noted, that the computer system 2000 can have some, most, or all of its functionality supplanted by a distributed computer system having a large number of dispersed computing nodes, such as would be the case where the functionality of the computer system 2000 is partly or wholly executed using a cloud computing environment.

Figure 21:
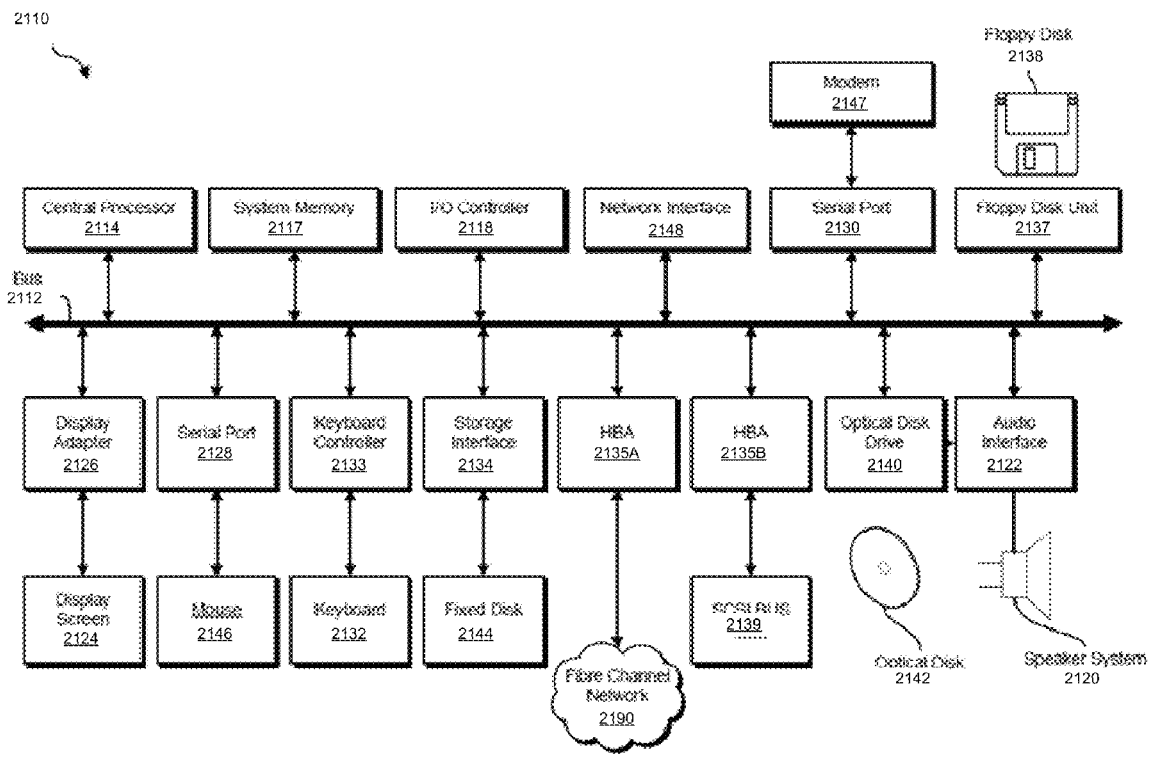
FIG. 21 depicts a block diagram of a second computer system suitable for implementing certain functionality in accordance with one embodiment of the present invention.

FIG. 21 depicts a block diagram of a second computer system 2110 suitable for implementing certain functionality in accordance with one embodiment of the present invention. Computer system 2110 includes a bus 2112 which interconnects major subsystems of computer system 2110, such as a central processor 2114, a system memory 2117 (typically RAM, but which may also include ROM, flash RAM, or the like), an input/output controller 2118, an external audio device, such as a speaker system 2120 via an audio output interface 2122, an external device, such as a display screen 2124 via display adapter 2126, serial ports 2128 and 2130, a keyboard 2132 (interfaced with a keyboard controller 2133), a storage interface 2134, a floppy disk drive 2137 operative to receive a floppy disk 2138, a host bus adapter (HBA) interface card 2135A operative to connect with a Fiber Channel network 2190, a host bus adapter (HBA) interface card 2135B operative to connect to a SCSI bus 2139, and an optical disk drive 2140 operative to receive an optical disk 2142. Also included are a mouse 2146 (or other point-and-click device, coupled to bus 2112 via serial port 2128), a modem 2147 (coupled to bus 2112 via serial port 2130), and a network interface 2148 (coupled directly to bus 2112).

Bus 2112 allows data communication between central processor 2114 and system memory 2117, which may include read-only memory (ROM) or flash memory (neither shown), and random access memory (RAM) (not shown), as previously noted. The RAM is generally the main memory into which the operating system and application programs are loaded. In the FIG. 21 embodiment, the system memory 2117 instantiates a replication manager module 2150 which implements the continuous replication functionality described above. The ROM or flash memory can contain, among other code, the Basic Input-Output system (BIOS) which controls basic hardware operation such as the interaction with peripheral components. Applications resident with computer system 2110 are generally stored on and accessed via a computer readable medium, such as a hard disk drive (e.g., fixed disk 2144), an optical drive (e.g., optical drive 2140), a floppy disk unit 2137, or other storage medium. Additionally, applications can be in the form of electronic signals modulated in accordance with the application and data communication technology when accessed via network modem 2147 or interface 2148.

Storage interface 2134, as with the other storage interfaces of computer system 2110, can connect to a standard computer readable medium for storage and/or retrieval of information, such as a fixed disk drive 2144. Fixed disk drive 2144 may be a part of computer system 2110 or may be separate and accessed through other interface systems. Modem 2147 may provide a direct connection to a remote server via a telephone link or to the Internet via an internet service provider (ISP). Network interface 2148 may provide a direct connection to a remote server via a direct network link to the Internet via a POP (point of presence). Network interface 2148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 21 need not be present to practice the present disclosure. The devices and subsystems can be interconnected in different ways from that shown in FIG. 21. The operation of a computer system such as that shown in FIG. 21 is readily known in the art and is not discussed in detail in this application. Code to implement the present disclosure can be stored in computer-readable storage media such as one or more of system memory 2117, fixed disk 2144, optical disk 2142, or floppy disk 2138. The operating system provided on computer system 2110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computerized method for providing object policy management, comprising:
   accessing a distributed computer system having a plurality of objects associated with a cluster within a common disk array, wherein each object comprises at least one virtual machine;
   processing the plurality of objects to obtain a list of object attributes associated with the at least one virtual machine of at least one object of the plurality of objects;
   providing a graphical user interface (GUI) to a user, wherein the GUI enables the user to specify a maximum resource limit of a named resource for backing up the at least one virtual machine of at least one object of the plurality of objects, wherein the GUI lists the named resource and allows the user to enter the maximum resource limit of the named resource;
   applying, via the GUI, a query to the plurality of objects to automatically generate an object management policy for object backup protection;
   selecting, via the GUI, the at least one virtual machine of the at least one object of the plurality of objects when the at least one virtual machine satisfies the query in accordance with the automatically generated object management policy based on at least one attribute value of at least one attribute of the at least one virtual machine; and
   restoring, upon a notification to restore a functionality of the at least one virtual machine of the at least one object of the plurality of objects, the at least one virtual machine of the at least one object of the plurality of objects to a last known good point in time using a standby virtual machine provisioned from a last known good point in time image to restore virtual machine functionality,
   wherein the query comprises a plurality of rules, each rule of the plurality of rules comprising a corresponding object attribute of a plurality of object attributes, a corresponding comparison operator of a plurality of comparison operators, and an attribute value expression, wherein at least one rule of the plurality of rules causes a selection of objects by inspecting a string associated with each object of the plurality of objects and detecting an absence of a specified string in a name of each object of the plurality of objects, and wherein the object policy management method enhances application availability by implementing a cluster wide application failover.

2. The method of claim 1, wherein the plurality of object attributes includes an indicator of whether each of the at least one virtual machine is powered off.

3. The method of claim 1, wherein the plurality of object attributes includes a name of each of the least one virtual machine.

4. The method of claim 1, wherein applying the query to the plurality of objects further comprises applying the plurality of rules logically connecting with logical operators, wherein the logical operators include a logical AND operator and a logical OR operator.

5. The method of claim 1, wherein the plurality of rules form a conditional expression for testing a value of a corresponding object attribute of the plurality of object attributes.

6. The method of claim 1, further comprising processing the plurality of objects to obtain a plurality of object attribute values for each object attribute of the plurality of object attributes, and wherein the attribute value expression comprises at least one object attribute value from the plurality of object attribute values.

7. A non-transitory computer readable storage medium having stored thereon, computer executable instructions that, if executed by a computer system cause the computer system to perform a method for providing object policy management, comprising:
   accessing a distributed computer system having a plurality of objects associated with a cluster within a common disk array, wherein each object comprises at least one virtual machine;
   processing the plurality of objects to obtain a list of object attributes associated with the at least one virtual machine of at least one object of the plurality of objects;
   providing a graphical user interface (GUI) to a user, wherein the GUI enables the user to specify a maximum resource limit of a named resource for backing up the at least one virtual machine of at least one object of the plurality of objects, wherein the GUI lists the named resource and allows the user to enter the maximum resource limit of the named resource;
   applying, via the GUI, a query to the plurality of objects to automatically generate an object management policy for object backup protection;
   selecting, via the GUI, the at least one virtual machine of the at least one object of the plurality of objects when the at least one virtual machine satisfies the query in accordance with the automatically generated object management policy based on at least one attribute value of at least one attribute of the at least one virtual machine; and restoring, upon a notification to restore a functionality of the at least one virtual machine of the at least one object of the plurality of objects, the at least one virtual machine of the at least one object of the plurality of objects to a last known good point in time using a standby virtual machine provisioned from a last known good point in time image to restore virtual machine functionality, wherein the query comprises a plurality of rules, each rule of the plurality of rules comprising a corresponding object attribute of a plurality of object attributes, a corresponding comparison operator of a plurality of comparison operators, and an attribute value expression, wherein at least one rule of the plurality of rules causes a selection of objects by inspecting a string associated with each object of the plurality of objects and detecting an absence of a specified string in a name of each object of the plurality of objects, and wherein the object policy management method enhances application availability by implementing a cluster wide application failover.

8. The non-transitory computer readable storage medium of claim 7, wherein the plurality of object attributes includes an indicator of whether each of the at least one virtual machine is powered off.

9. The non-transitory computer readable storage medium of claim 7, wherein the plurality of object attributes includes a name of each of the least one virtual machine.

10. The non-transitory computer readable storage medium of claim 7, wherein applying the query to the plurality of objects further comprises applying the plurality of rules logically connecting with logical operators, wherein the logical operators include a logical AND operator and a logical OR operator.

11. The non-transitory computer readable storage medium of claim 7, wherein the plurality of rules form a conditional expression for testing a value of a corresponding object attribute of the plurality of object attributes.

12. The non-transitory computer readable storage medium of claim 7, further comprising processing the plurality of objects to obtain a plurality of object attribute values for each object attribute of the plurality of object attributes, and wherein the attribute value expression comprises at least one object attribute value from the plurality of object attribute values.

13. A server computer system, comprising:
a computer system having a processor coupled to a computer readable storage media and executing computer readable code which causes the computer system to implement an object policy manager that functions by:
  accessing a distributed computer system having a plurality of objects associated with a cluster within a common disk array, wherein each object comprises at least one virtual machine;
  processing the plurality of objects to obtain a list of object attributes associated with the at least one virtual machine of at least one object of the plurality of objects;
  providing a graphical user interface (GUI) to a user, wherein the GUI enables the user to specify a maximum resource limit of a named resource for backing up the at least one virtual machine of at least one object of the plurality of objects, wherein the GUI lists the named resource and allows the user to enter the maximum resource limit of the named resource;
  applying, via the GUI, a query to the plurality of objects to automatically generate an object management policy for object backup protection;
  selecting, via the GUI, the at least one virtual machine of the at least one object of the plurality of objects when the at least one virtual machine satisfies the query in accordance with the automatically generated object management policy based on at least one attribute value of at least one attribute of the at least one virtual machine; and
  restoring, upon a notification to restore a functionality of the at least one virtual machine of the at least one object of the plurality of objects, the at least one virtual machine of the at least one object of the plurality of objects to a last known good point in time using a standby virtual machine provisioned from a last known good point in time image to restore virtual machine functionality,
  wherein the query comprises a plurality of rules, each rule of the plurality of rules comprising a corresponding object attribute of a plurality of object attributes, a corresponding comparison operator of a plurality of comparison operators, and an attribute value expression, wherein at least one rule of the plurality of rules causes a selection of objects by inspecting a string associated with each object of the plurality of objects and detecting an absence of a specified string in a name of each object of the plurality of objects, and wherein the object policy management method enhances application availability by implementing a cluster wide application failover.

14. The server computer system of claim 13, wherein the plurality of object attributes includes an indicator of whether each of the at least one virtual machine is powered off.

15. The server computer system of claim 13, wherein the plurality of object attributes includes a name of each of the least one virtual machine.

16. The server computer system of claim 13, wherein applying the query to the plurality of objects further comprises applying the plurality of rules logically connecting with logical operators, wherein the logical operators include a logical AND operator and a logical OR operator.

17. The server computer system of claim 13, wherein the plurality of rules form a conditional expression for testing a value of a corresponding object attribute of the plurality of object attributes.

18. The server computer system of claim 13, further comprising processing the plurality of objects to obtain a plurality of object attribute values for each object attribute of the plurality of object attributes, and wherein the attribute value expression comprises at least one object attribute value from the plurality of object attribute values.

* * * * *